United States Patent
Louzir et al.

(10) Patent No.: US 10,038,233 B2
(45) Date of Patent: Jul. 31, 2018

(54) MULTI-BAND RFID DEVICE (71) Applicant: THOMSON LICENSING, Issy les Moulineaux (FR)

(72) Inventors: Ali Louzir, Rennes (FR); Jean-Yves Le Naour, Pace (FR)

(73) Assignee: THOMSON LICENSING, Issy les Moulineaux (FR)

( * ) Notice: Subject to any disclaimer, the term of this patent is extended or adjusted under 35 U.S.C. 154(b) by 82 days.

(21) Appl. No.: 15/333,480

(22) Filed: Oct. 25, 2016

(65) Prior Publication Data
US 2017/0117607 A1 Apr. 27, 2017

(30) Foreign Application Priority Data

Oct. 26, 2015 (EP) ...................................... 15306709

(51) Int. Cl.
- *H01Q 1/22* (2006.01)
- *H01Q 5/50* (2015.01)
- *H01Q 9/06* (2006.01)

(52) U.S. Cl.
CPC ............. *H01Q 1/2216* (2013.01); *H01Q 5/50* (2015.01); *H01Q 9/065* (2013.01)

(58) Field of Classification Search
CPC .. H01Q 1/22; H01Q 5/00; H01Q 7/00; H01Q 9/00; H01Q 21/062; G06K 19/07
USPC ......... 343/700 MS, 725, 793, 787, 788, 866, 343/895

See application file for complete search history.

(56) References Cited

U.S. PATENT DOCUMENTS

| | | | |
|---|---|---|---|
| 7,589,675 B2 | 9/2009 | Chang et al. | |
| 8,232,923 B2* | 7/2012 | Yang | G06K 19/07786 340/572.7 |
| 8,544,758 B2 | 10/2013 | Wilkinson | |
| 2011/0090058 A1* | 4/2011 | Ikemoto | H01Q 5/35 340/10.1 |
| 2011/0285511 A1 | 11/2011 | Maguire et al. | |
| 2012/0182128 A1* | 7/2012 | Ikemoto | H01Q 1/2208 340/10.1 |
| 2012/0249306 A1 | 10/2012 | Tada | |

FOREIGN PATENT DOCUMENTS

| | | |
|---|---|---|
| JP | 2008041005 | 2/2008 |
| JP | 2012108843 | 6/2012 |
| KR | 2011057325 | 6/2011 |

* cited by examiner

*Primary Examiner* — Dameon E Levi
*Assistant Examiner* — Hasan Islam
(74) *Attorney, Agent, or Firm* — Brian J. Dorini; Patricia A. Verlangieri (57) ABSTRACT

The invention relates to a device comprising at least a first RFID module and a second RFID module, each comprising a chip coupled to a wire loop antenna. The first and second RFID modules operate at a first operating frequency into a first frequency band and at a second operating frequency into a second frequency band respectively, the second operating frequency being substantially equal to a multiple k of the first operating frequency, with k≥2. The device further comprises a resonant half-wave dipole having a length (L) that is substantially equal to $\lambda/2$ where $\lambda$ is a wavelength associated to the first frequency band. The first module is present in the vicinity of the center of the half-wave dipole and the second module is present at a distance substantially equal to $(2*n+1)\lambda/4*k$ from an end of the half-wave dipole, with n∈[0 . . . k−1].

7 Claims, 6 Drawing Sheets

PRIOR ART

MULTI-BAND RFID DEVICE

1. REFERENCE TO RELATED EUROPEAN APPLICATION

This application claims priority from European Application No. 15306709.5, entitled "Multi-Band RFID Device," filed on Oct. 26, 2015, the contents of which are hereby incorporated by reference in its entirety.

2. TECHNICAL FIELD

The present invention relates RFID (Radio Frequency IDentification) devices operating in at least two distinctive frequency bands. The invention can be integrated into RFID systems operating in at least two distinctive frequency bands corresponding to at least two different standards and/or two different geographical areas.

3. BACKGROUND ART

A variety of RFID systems exist. They differ in terms of range, size, cost and underlying technology and can be classified in two main classes operating in different frequency bands: inductive systems operating at frequencies lower than 100 MHz and radiative systems operating at frequencies greater than 100 MHz.

The difference between the two classes is based on the type of the physical coupling between the reader and the RFID tag which could be either magnetic (inductive coupling) or electromagnetic (radiative coupling). For the first class of RFID technology, the RFID tag gets its energy from the proximity coupled magnetic field and responds by loading its own antenna with different impedances, while for the second class, the RFID tag gets its energy from the electromagnetic field radiated by the reader and reflects it back modulating with its own impedances presenting different Radar Cross Section (RCS).

The coupling nature of the first class (inductive coupling) limits the read range to the size of the reader or the tag antenna (generally few centimeters) while the range of the second class-radiative coupling) could reach up to tens of meters depending on the nature of tags (passive and active) and its sensitivity. The popular access control application based on Near Field Communication (NFC) standard falls in the first class.

The present invention sets out to addresses the second class of long range RFID systems, namely the radiative RFID systems operating in the UHF and above frequency bands. The exact frequency bands and associated maximum allowable radiated power of currently available RFID systems are given in Table 1 and 2 below.

TABLE 1

Relevant standards of RFID systems

| Frequency range | <135 KHz [LF] | 13.56 MHz [HF] | 860-960 MHz [UHF] | 2.45 GHz [Microwave] |
|---|---|---|---|---|
| Relevant standards | ISO 11784 & 11785<br>ISO/IEC 18000-2<br>ISO 14223-1 | ISO/IEC 18000-3<br>EPC class-1<br>ISO 15693<br>ISO 14443 (A/B) | ISO/IEC 18000-6<br>EPC class-0, class-1 | ISO/IEC 18000-4 |

TABLE 2

ITU Frequency regulation a. LF Band (119-135 kHz)

| USA/Canada | Europe | Japan | China |
|---|---|---|---|
| $2400/f(inkHz)^{mW/m}$ @ 300 m | 119-127 kHz:<br>66 dBµA/m @ 10 m<br>127-135 kHz:<br>42 dBµA/m @ 10 m | 30 V/m @ 3 m | $P_{mwk} < 1$ W | b. HF Band (13.56 MHz)

| USA/Canada | Europe | Japan | China |
|---|---|---|---|
| 13.553-13.567 MHz<br>42 dBµA/m @ 10 m | 13.553-13.567 MHz<br>42 dBµA/m @ 10 m | 13.553-13.567 MHz<br>42 dBµA/m @ 10 m | 13.553-13.567 MHz<br>42 dBµA/m @ 10 m | c. UHF Band (860-960 MHz)

| USA/Canada | Europe | Japan | China |
|---|---|---|---|
| 902-928 MHz<br>$P_{e.i.r.p.}^{2} = 4$ W | 865.0-868.0 MHz $P_{e.r.p.} = +20$ dBm<br>865.6-868.0 MHz $P_{e.r.p.} = +27$ dBm<br>865.6-867.6 MHz $P_{e.r.p.} = +33$ dBm | 952-955 MHz<br>$P_{e.r.p.} = 1$ W + 6 dB ant<br>gain = 4 W | 840.5-854.5 MHz $P_{e.r.p.} = 2$ W<br>920.5-924.5 MHz $P_{e.r.p.} = 2$ W<br>(Available since May 2007) |

TABLE 2-continued

ITU Frequency regulation d. Microwave Band (2.45 GHz)

| USA/Canada | Europe | Japan | China |
|---|---|---|---|
| 2.400-2.483 GHz $P_{e.i.r.p.}$ = 4 W | 2.446-2.454 GHz $P_{e.i.r.p.}$ = 500 mW or 4 W (Indoors) | 2.400-2.4835 GHz 3 mW/MHz($P_{e.i.r.p.}$ = 1 W) | 2.400-2.425 GHz 250 mW/m @ 3 m ($P_{e.i.r.p.}$ = 21 mW) |

[1]Listen-before-talk for 200 kHz channels.
[2]Equivalent isotropically radiated power (e.i.r.p) = 1.64 × Effective Radiated Power (e.r.p.)

The exact frequency bands and associated maximum allowable radiated power of currently available RFID systems are generally fixed by local and regional regulation bodies (ETSI, FCC etc.). Further to the frequency bands indicated in Tables 1 and 2, some RFID applications use the 433 MHz frequency band and the use of the 5 GHz ISM band is expected for the future for WiFi systems. Therefore, in order to insure the operability of RFID tags all over the world, it may be worth to have a tag that could work at more than one frequency.

Figure 1:
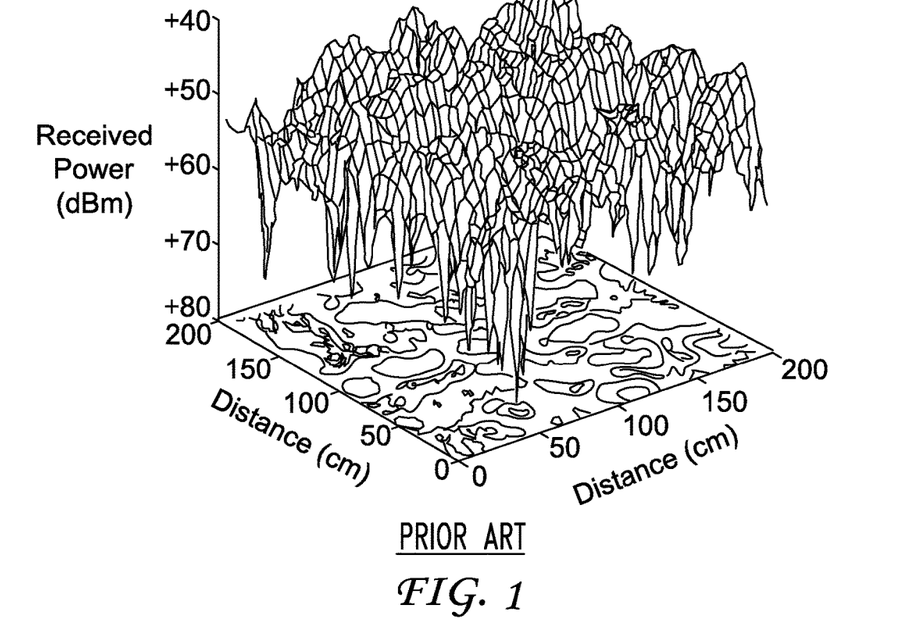
FIG. 1 is a chart illustrating the indoor multipath fading effect at 900 MHz.

On the other side, UHF frequency bands and microwave frequency bands suffer from range limitation and interferences due to the well-known multipath frequency selective fading. FIG. 1 shows a graph presenting an example of variations of magnitudes of a received RF signal at UHF frequency within an indoor area having coordinates X and Y of 2 m×2 m, respectively. As can be seen on this figure, variations of the RF signal of up to 40 dB could appear over distances of a few tens of centimeters. Such fast fading signal could, disadvantageously, prevent the activation of one RFID tag even for a transmission from a close RFID reader whereas the same tag could be disadvantageously activated by a distant RFID reader increasing the interference issue. A situation may happen in which an RFID tag is located in a so-called fade region with respect to a signal transmitted by a close RFID reader and in a so-called crest region with respect to a signal transmitted by a distant RFID reader.

To mitigate this well-known problem it is possible to use antenna diversity (or spatial diversity) at the reader or the tag side. The use of spatial diversity requires at least two antennas with a minimum of space separation between the two antennas. Typically a quarter wave lambda separation is required in order to insure sufficient de-correlation between the two antennas. This minimum distance between the two antennas is approximately equal to 8 cm at 900 MHz and 17 cm at 433 MHz.

This minimum distance is not always available in the reader side, in particular when the reader is integrated into mobile devices such as a smartphone or a tablet. The required space for antenna diversity is even less available in the tag side and many objects to be tagged are sized to receive only one single small antenna.

4. SUMMARY OF INVENTION

A purpose of the present invention is to mitigate the RFID range limitation and interferences issues due to multipath frequency fading experienced with long range RFID systems operating in the UHF or microwave RFID bands.

The use of multi-band radio frequency identification (RFID) device may be seen as an alternative solution to antenna diversity. Frequency diversity is an alternative solution to space diversity, provided that compact and cost effective multi-band frequency tags are available.

According to an aspect of the invention, there is provided a compact RFID device operating in at least two different frequency bands, for example the 433 MHz band and the 900 MHz band. Compactness may be achieved by using a resonant half-wave dipole coupled to two RFID modules.

More specifically, a first aspect of the invention relates to a device comprising at least a first RFID module and a second RFID module, each of said at least first and second RFID modules comprising a chip coupled to a wire loop antenna wherein the first and second RFID modules operate at a first operating frequency in a first frequency band and at a second operating frequency in a second frequency band respectively, the second operating frequency being substantially equal to a multiple k of the first operating frequency, with k≥2. The device further comprises a resonant half-wave dipole having a length that is substantially equal to $\lambda/2$ where $\lambda$ is a wavelength associated with the first frequency band, the first and second modules being present along the resonant half-wave dipole in order that the wire loop antenna of said first and second modules is magnetically coupled to the resonant half-wave dipole. The first module is present in the vicinity of the centre of the resonant half-wave dipole and the second module is present at a distance substantially equal to $(2*n+1)\lambda/(4*k)$ from an end of the resonant half-wave dipole, with n∈[0 . . . k−1].

According to an embodiment, the resonant half-wave dipole is a conductive rectilinear strip.

According to another embodiment, the resonant half-wave dipole is a conductive meander strip.

According to a particular embodiment, the first and second RFID modules are arranged on the same side of the resonant half-wave dipole.

According to another embodiment, the first and second RFID modules are arranged on opposite sides of the resonant half-wave dipole.

According to another embodiment, the device further comprises a third RFID module present along the resonant half-wave dipole and operating at a third operating frequency in a third frequency band, said third frequency being substantially equal to a multiple k' of the first operating frequency, with k'≈k and k'≥2, and wherein the second module is present at a distance substantially equal to $(2*n+1)\lambda/(4*k')$ from an end of the resonant half-wave dipole, with n∈[0 . . . k'−1]. In this embodiment, the RFID device operates in three frequency bands.

It will be appreciated that, the invention may be applied to RFID devices operating in more than three frequency bands.

According to another embodiment, the RFID device further comprises a fourth RFID module present along the resonant half-wave dipole and operating at a fourth operating frequency in the second frequency band, said fourth frequency being different from the second operating frequency but being substantially equal to the multiple k of the first operating frequency. In this embodiment, the second RFID module and the fourth RFID module are present at a distance substantially equal to $(2*n+1)\lambda/(4*k)$ and $(2*n+1)\lambda/(4*k)$ from an end of the resonant half-wave dipole, with $n,n' \in [0 \ldots k-1]$ and $n' \neq n$. In this embodiment, the RFID device operates in two distinctive frequency bands and more specifically at one operating frequency (the first operating frequency) in the first frequency band and at two operating frequencies (the second and fourth operating frequencies) in the second frequency band.

Another aspect of the invention relates to radio frequency identification device operating at a plurality of frequency bands comprising a resonant half wave dipole having a fundamental frequency mode of the lowest frequency band, and a plurality of loop antennas magnetically coupled to the dipole, the plurality of loop antennas comprising a loop antenna operating at the fundamental frequency mode and at least one loop antenna operating at a harmonic frequency mode, each loop being arranged around a plane of maximum current of the resonant harmonic frequency mode

5. BRIEF DESCRIPTION OF THE DRAWINGS

The invention can be better understood with reference to the following description and drawings, given by way of example and not limiting the scope of protection, and in which.

6. DESCRIPTION OF EMBODIMENTS

While example embodiments are capable of various modifications and alternative forms, embodiments thereof are shown by way of example in the drawings and will herein be described in details. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Figure 2:
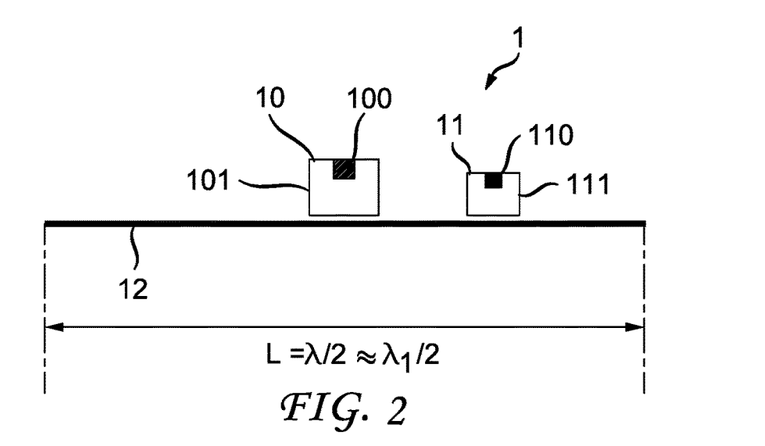
FIG. 2 is a first schematic view illustrating a first embodiment of the invention.
Figure 3:
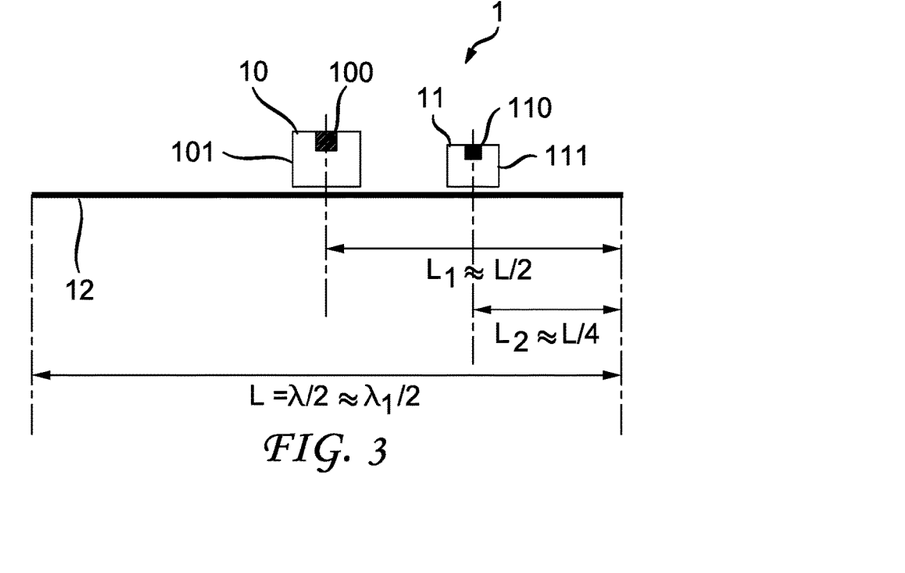
FIG. 3 is a schematic view showing the spatial position of the RFID modules of the first embodiment of the invention.

FIGS. 2 and 3 schematically depict a dual-band RFID device according to a first embodiment of the invention.

The RFID device 1 comprises two RFID modules or wire loop tags 10 and 11. Each of these RFID modules comprises a chip coupled to a wire loop antenna. More specifically, the module 10 comprises a chip 100 and a wire loop antenna 101 while the module 11 comprises a chip 110 and a wire loop antenna 111.

Examples of RFID modules or wire loop tags are adhesive tags, referenced ALN—9613 SIT, provided by Alien Technology or tags, referenced MuTRAK, provided by Tagsys RFID.

According to this embodiment of the invention, the RFID modules 10 and 11 operate in two distinctive frequency bands, for example the 433 MHz band for the module 10 and the 900 MHz band for the module 11. Of course, other RFID bands may be used as mentioned later in the present specification. The RFID module 10 operates at a first operating frequency $f_1$ in a first frequency band and the RFID module 11 operates at a second operating frequency $f_k$ in a second frequency band. The operating frequency $f_k$ is substantially equal to a multiple k of the first operating frequency $f_1$, with $k \geq 2$. In the example of FIG. 2, k=2.

Preferably, the device 1 further comprises a resonant half-wave dipole 12 having a length L associated with a wavelength $\lambda$ associated with the first frequency band. As the operating frequency f1 is included in the first frequency band, the wavelength $\lambda$ is close or equal to the wavelength $\lambda_1$ associated with the first operating frequency $f_1$. So $L = \lambda/2 \approx \lambda_1/2$.

In addition, the modules 10 and 11 are arranged along the resonant half-wave dipole 12 in order that their wire loop antennas are each placed around a short circuit plane (i.e. a plan of a maximum of current) of the resonant mode of the half-wave dipole 12. This condition is met when the module 10 is present in the vicinity of the centre of the resonant half-wave dipole 12 and when the module 11 is present at a distance substantially equal to $(2*n+1)\lambda/(4*k)$ from an end of the resonant half-wave dipole 12, with $n \in [0 \ldots k-1]$.

The module 10 is thus arranged at a distance $L_1 \approx L/2 = \lambda/4$ from an end of the resonant half-wave dipole 12. And if k=2, as illustrated by FIGS. 2 and 3, the module 11 may be arranged at a distance $L_2 \approx \lambda/8$ or $3\lambda/8$ from an end of resonant half-wave dipole 12.

The involved phenomenon and the operation of the RFID device 1 of FIG. 2 will be explained in detail in the following paragraphs.

Figure 4:
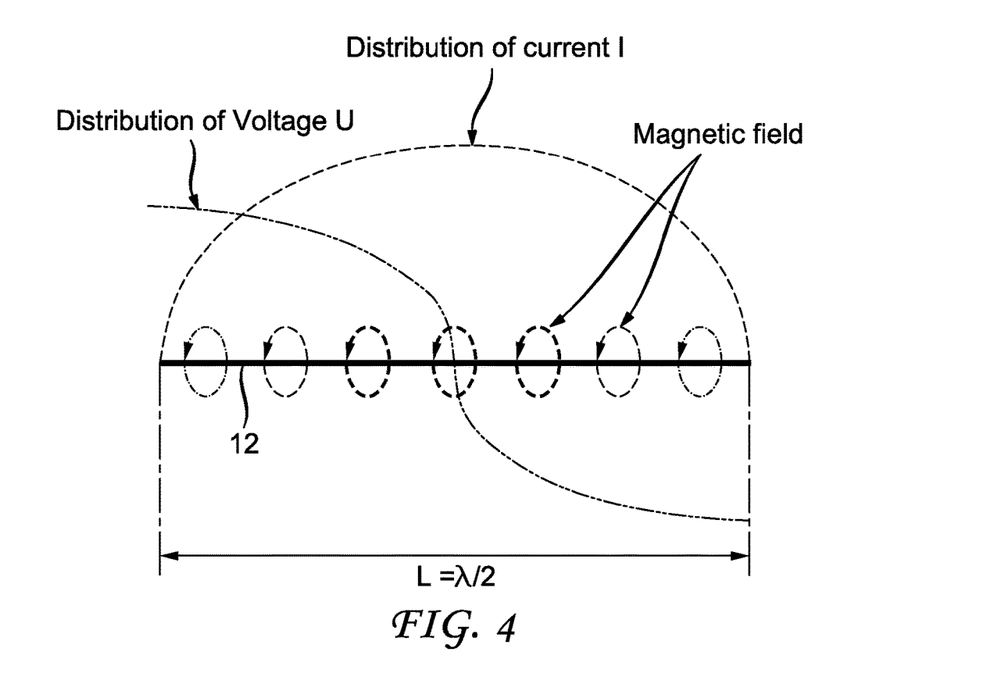
FIG. 4 illustrates the current, voltage and magnetic field distributions along a half-wave dipole.
Figure 5:
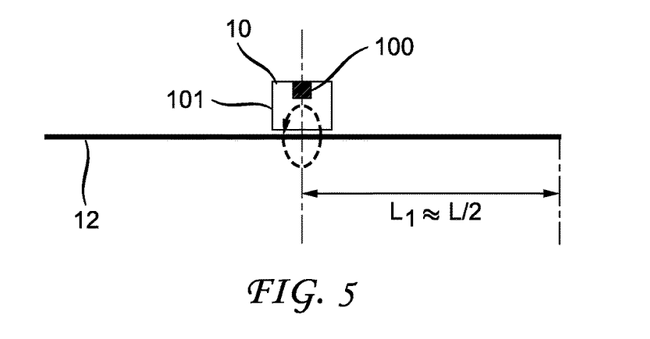
FIG. 5 illustrates the optimal position of a first RFID module along the half-wave dipole of FIG. 4.

FIG. 4 shows current and voltage distributions along the half-wave dipole 12 as well as the corresponding magnetic field. The magnetic field is maximum at the middle of the dipole ($\lambda_1/4$) and minimum at the edges. The magnetic field is shown by a dashed line the thickness of which is depending on the magnitude of the magnetic field. Therefore, for the fundamental mode of the half-wave dipole, the optimum magnetic coupling to the wire loop of a RFID module is obtained at the centre of the dipole. So the RFID module 10 operating at the frequency $f_1$ is arranged at the middle of the half-wave dipole 12 as illustrated in FIG. 5.

The optimum coupling may be adjusted by adjusting the relative distance between the wire loop antenna 101 and the half-wave dipole 12 and/or by slightly moving the wire loop antenna 101 around the centre of the half-wave dipole 12.

In addition, the present invention takes advantage of the fact that the frequency bands allowed for long range RFID systems are almost multiple of each other. That is, a half wave dipole antenna of length $L=\lambda/2\approx\lambda_1/2$ at a frequency $f_1=433$ MHz (resp. $f_3=2.4$ GHz) has substantially a length of at a frequency $f_2=900$ MHz (resp. $f_4=5$ GHz). Likewise, a half wave dipole antenna of length $L'=\lambda_2/2$ at frequency $f_2=900$ MHz has a length of approximately $3\times\lambda_3/2$ at the frequency of $f_3=2.4$ GHz.

Figure 6:
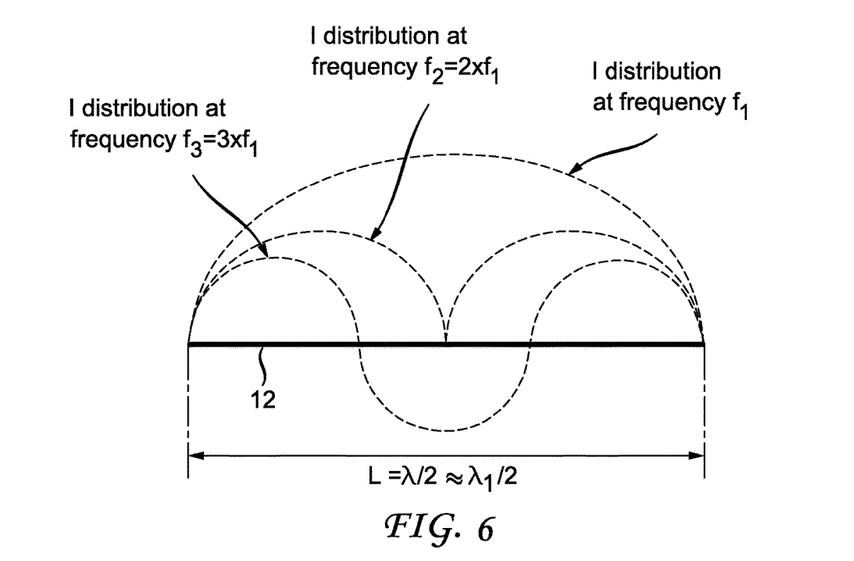
FIG. 6 illustrate the current distribution along a half-wave dipole at a fundamental frequency and at two harmonic frequencies.

FIG. 6 shows the current distribution of a half-wave dipole at the fundamental mode (frequency $f_1$) and at the two first harmonic modes (frequencies $f_2=2\times f_1$ and $f_3=3\times f_1$).

Figure 7:
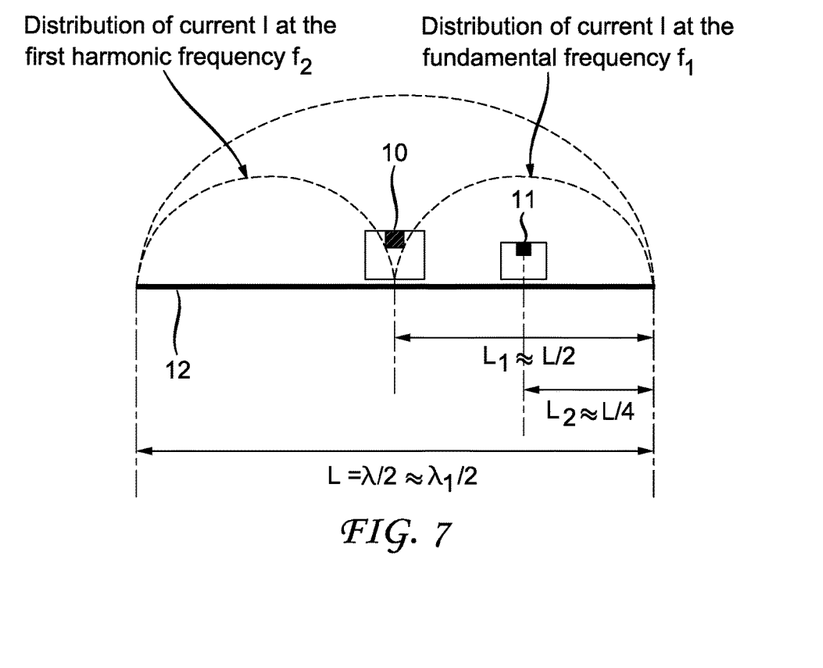
FIG. 7 illustrate the position of two RFID modules operating at a fundamental frequency $f_1$ and a first harmonic frequency $f_2$ respectively.

As illustrated in FIG. 7, the principle of the invention is to use a resonant half-wave dipole at the fundamental mode corresponding to the lowest frequency band (e.g. 433 MHz band), magnetically coupled to several miniature wire-loop tags or RFID modules (2 in the case of FIG. 7) operating at the fundamental (i.e. 433 MHz band) or the harmonic frequency bands (e.g. 900 MHz band). For efficient coupling of the RFID modules 10 and 11 to the resonant half-wave dipole 12 at the different frequencies, each RFID module is placed around a short circuit plane (i.e. a plan of a maximum of current) of the corresponding resonant mode of the half-wave dipole 12. In the example of FIG. 7, the module 10 is placed at a distance $L_1=L/2\approx\lambda/4$ from the right end of the dipole 12 and the module 11 is placed at a distance $L_2=L/4\approx\lambda/8$ from the right end of the dipole 12.

FIGS. 1 to 7 have illustrated a dual-band RFID device operating at a fundamental frequency $f_1$ into a first frequency band (e.g. 433 MHz band or 2.4 GHz band) and a first harmonic frequency $f_2$ into a second frequency band (e.g. 900 MHz band or 5 GHz band). The frequencies $f_1$ and $f_2$ are for example the following ones: $f_1=433$ MHz and $f_2=866$ MHz or $f_1=2.45$ GHz and $f_2=5$ GHz.

Figure 8:
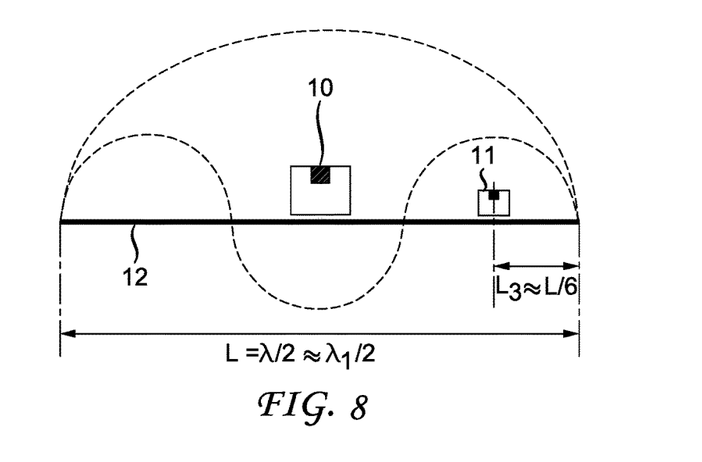
FIG. 8 illustrate the position of two RFID modules operating at a fundamental frequency $f_1$ and a second harmonic frequency $f_3$ respectively.

FIG. 8 shows another example of dual-band RFID device operating at a fundamental frequency ($f_1$) and a third harmonic frequency ($f_3=3\times f_1$). The RFID module 10 is placed at the middle of the half-wave dipole 12 and the RFID module 11 is arranged substantially at a length $L_3=L/6=\lambda/12$ from the right end of the half-wave dipole. The module 11 could also be placed at a length of $3\lambda/12$ or $5\lambda/12$ from the right end of the half-wave dipole.

An RFID device in accordance with described embodiments provides the following advantages:
  it provides a compact and cost effective dual band RFID device since the two RFID modules are coupled to a same resonant half-wave dipole; and
  this solution uses Commercial Off The Shelf (COTS) RFID modules or tags as those provided by Tagsys or Alien Technology The above-described RFID comprises two RFID modules 10 and 11 coupled to a conductive rectilinear strip 12 used as a resonant half-wave dipole and the two RFID modules are arranged on the same side of the resonant half-wave dipole 12.

Figure 9:
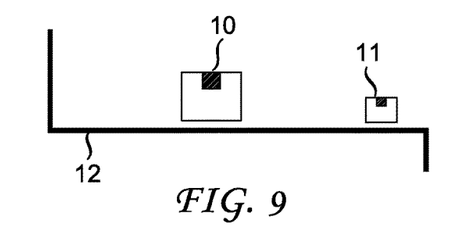
FIGS. 9 to 11 illustrate different possible shapes of the half-wave dipole.
Figure 10:
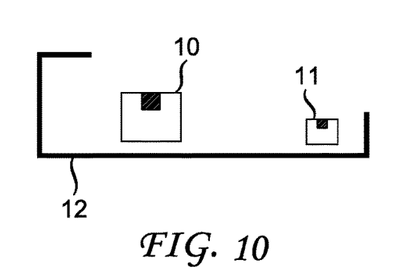
Figure 11:
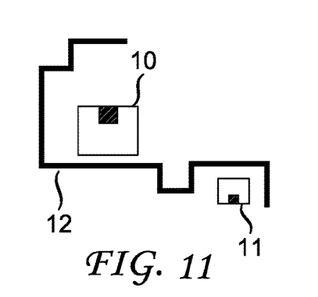

Different variants are possible. In a first variant, other shapes of half-wave dipole can be used. In FIGS. 9 to 11, the resonant half-wave dipole 12 is a conductive meander strip. The shape of the half wave dipole can adapted in order to match the form factor and the size of the available space of the object to be tagged with RFID device.

Figure 12:
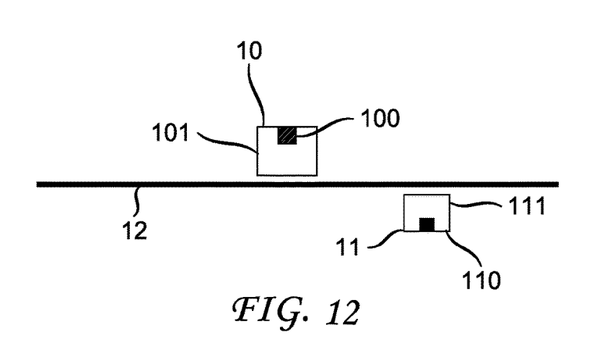
FIG. 12 illustrate a first variant of the RFID device according to the invention.

In another variant illustrated by FIG. 12, the RFID modules 10 and 11 are arranged on opposite sides of the resonant half-wave dipole 12.

In another variant, the wire-loop antenna 101 or 111 of the RFID modules can have different shapes or dimensions than those shown in the FIGS. 2-12.

Figure 13:
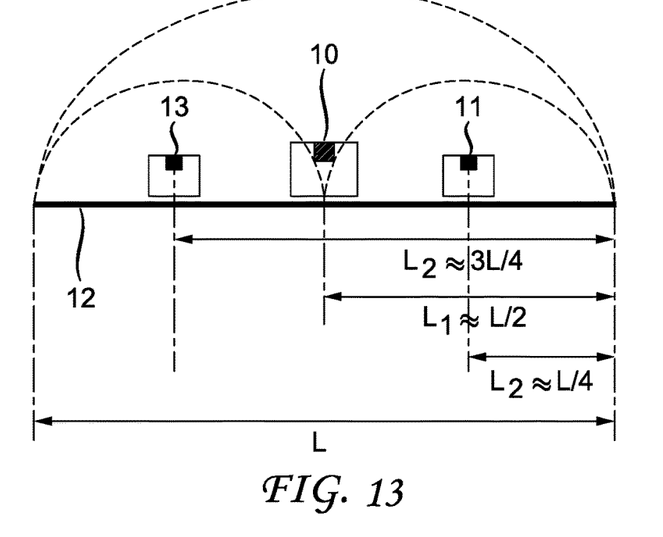
FIG. 13 illustrate a second variant of the RFID device according to the invention.

In addition, the dual-band RFID device according to invention can also comprise an additional RFID module 13 present along the resonant half-wave dipole 12 and operating at the operating frequency $f_2$ or at an operating frequency $f_{2'}$ in the second frequency band as illustrated by FIG. 13. In this figure, the RFID module 11 is arranged at a distance $L_2=L/4=\lambda/8$ from the right end of the half-wave dipole 12 and the RFID module 13 is arranged at a distance $L_2=3L/4=3\lambda/8$ from the right end of the half-wave dipole 12. The two modules 11 and 13 operate in the same frequency band. They can operate at the same frequency, for example $f_2=f_{2'}=866$ MHz and they can operate at different frequencies, for example $f_2=866$ MHz (for Europe) and $f_{2'}=915$ MHz (for United States).

In this variant, as a general rule, the RFID module 11 operating at the operating frequency fk is arranged at a distance substantially equal to $(2*n+1)\lambda/(4*k)$ from an end of the half-wave dipole 12, with $n\in[0 \ldots k-1]$, and the RFID module 13 operating at the operating frequency $f_{k'}$ is arranged at a distance substantially equal to $(2*n'+1)\lambda/(4*k)$ from the above mentioned end of the half-wave dipole 12, with $n'\in[0 \ldots k-1]$ and $n'\neq n$.

Figure 14:
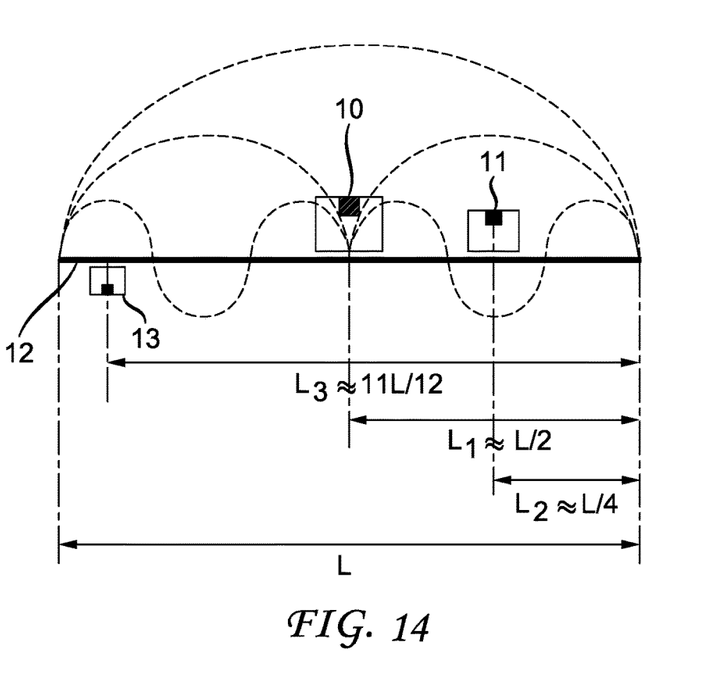
FIG. 14 illustrate a third variant of the RFID device according to the invention.

In another variant illustrated by FIG. 14, the RFID device operates in three frequency bands, for example the 433 MHz band, the 900 MHz band and the 2.4 GHz band. The device comprises a RFID module 10 operating at the operating frequency $f_1$, a RFID module 11 operating at the operating frequency $f_2\approx 2\times f_1$ and a RFID module 13 operating at the operating frequency $f_3\approx 3\times f_2=6\times f_1$ The RFID modules are placed around a short circuit plane (maximum current) associated to their operating frequency along the half-wave dipole 12.

In FIG. 14, the RFID module 10, 11 and 13 are arranged at a distance $L_1=L/2=\lambda/4$, $L_2=L/4=\lambda/8$ and $L_3=11L/12=11\lambda/24$ from the right end of the half-wave dipole 12.

In this variant, as a general rule, the RFID module 13 operating at the operating frequency $f_k$ is arranged at a distance substantially equal to $(2*n+1)\lambda/(4*k)$ from an end of the half-wave dipole 12, with $n\in[0 \ldots k-1]$,

The invention claimed is:

1. A device comprising:
  a first radio frequency identification module and a second radio frequency identification module, each of said first and second radio frequency identification modules comprising a chip coupled to a wire loop antenna, wherein the first and second radio frequency identification modules operate at a first operating frequency (f1) in a first frequency band and at a second operating frequency (fk) in a second frequency band respectively, the second operating frequency (fk) being substantially equal to a multiple k of the first operating frequency (f1), with k≥2,
  wherein the device further comprises a resonant half-wave dipole having a length (L) that is substantially equal to $\lambda/2$, where $\lambda$ is a wavelength associated with the first frequency band, the first and second modules being present along the resonant half-wave dipole such that the wire loop antenna of said first and second modules is magnetically coupled to the resonant half-wave dipole, and
  wherein the first module is present in the vicinity of the centre of the resonant half-wave dipole and the second module is present at a distance substantially equal to $(2*n+1)\lambda/(4*k)$ from an end of the resonant half-wave dipole, with $n\in[0 \ldots k-1]$.

2. The device according to claim 1, wherein the resonant half-wave dipole is a conductive rectilinear strip.

3. The device according to claim 1, wherein the resonant half-wave dipole is a conductive meander strip.

4. The device according to claim 1, wherein the first and second radio frequency identification modules are arranged on the same side of the resonant half-wave dipole.

5. The device according to claim 1, wherein the first and second radio frequency identification modules are arranged on opposite sides of the resonant half-wave dipole.

6. The device according to claim 1, further comprising a third radio frequency identification module present along the resonant half-wave dipole and operating at a third operating frequency (fk') in a third frequency band, said third frequency being substantially equal to a multiple k' of the first operating frequency (f1), with k'≠k and k'≥2, and wherein the second module is present at a distance substantially equal to $(2*n+1)\lambda/(4*k')$ from an end of the resonant half-wave dipole, with n∈[0 ... k'−1].

7. The device according to claim 1, further comprising a fourth radio frequency identification module present along the resonant half-wave dipole and operating at a fourth operating frequency (fk') in the second frequency band, said fourth frequency being different from the second operating frequency (fk) but being substantially equal to the multiple k of the first operating frequency (f1), and wherein the second radio frequency identification module and the fourth radio frequency identification module are present at a distance substantially equal to $(2*n+1)\lambda/(4*k)$ and $(2*n'+1)\lambda/(4*k)$ from an end of the resonant half-wave dipole, with n, n'∈[0 ... k−1] and n'≠n.

\* \* \* \* \*